United States Patent [19]

Blytas et al.

[11] Patent Number: 4,861,447
[45] Date of Patent: Aug. 29, 1989

[54] PROCESS FOR REDUCING CORROSIVE IMPURITIES IN SULFOLANE USED FOR EXTRACTING AROMATIC HYDROCARBONS

[75] Inventors: George C. Blytas; Robert F. Knott, both of Houston, Tex.

[73] Assignee: Shell Oil Company, Houston, Tex.

[21] Appl. No.: 199,837

[22] Filed: May 27, 1988

[51] Int. Cl.$^4$ .................. B01D 17/06; B03C 5/00; C02F 1/48

[52] U.S. Cl. .................. 204/181.8; 204/182.4; 204/186

[58] Field of Search .................. 204/181.8, 186, 182.4; 208/325

[56] References Cited

U.S. PATENT DOCUMENTS

| | | | |
|---|---|---|---|
| 2,996,442 | 8/1961 | Eberly | 204/181.8 |
| 3,252,997 | 5/1966 | Ridderikoff et al. | 549/87 |
| 4,177,119 | 12/1979 | Watanabe | 204/182.4 |
| 4,501,902 | 2/1985 | Cleary | 549/87 |

FOREIGN PATENT DOCUMENTS 2163741A  3/1986  United Kingdom .

OTHER PUBLICATIONS

Thompson Chem. Abst. 77:90966m (1972).
Thompson Chem. Abst. 76:07003j (1972).

Primary Examiner—John F. Niebling
Assistant Examiner—Isabelle Rodriqurz
Attorney, Agent, or Firm—Ronald R. Reper

[57] ABSTRACT

A process is disclosed for reducing the level of corrosive impurities in sulfolane solution originating from a process for the extraction of aromatic hydrocarbons from petroleum, which process comprises providing an aqueous solution of sulfolane having a sulfolane concentration less than about 80% by weight and electrodialyzing said aqueous solution to obtain a diluate stream containing a great majority of the sulfolane and having greatly reduced level of corrosive impurities.

4 Claims, No Drawings

PROCESS FOR REDUCING CORROSIVE IMPURITIES IN SULFOLANE USED FOR EXTRACTING AROMATIC HYDROCARBONS

BACKGROUND OF THE INVENTION

The present invention relates to a process for reducing the level of corrosive impurities in sulfolane which has been used to extract aromatic hydrocarbons from petroleum. Sulfolane (tetrahydrothiophene 1,1-dioxide, also referred to as tetramethylene sulfone), is a colorless highly polar compound having excellent solvent properties, very good chemical and thermal stability and is generally considered to be non-corrosive to carbon steel.

Sulfolane is applied in a number of liquid-liquid and liquid-vapor extractions, and is particularly suitable for the extraction of aromatic compounds such as benzene, toluene and o, m and p-xylenes from hydrocarbon streams having a carbon number from about $C_6$ to about $C_{10}$. These aromatic compounds typically are not plentiful in crude petroleum, but are produced by thermal or catalytic reforming. Many catalytic reforming processes use a platinum-containing catalyst, and up to 1% by weight of a halogen may be used as a promoter to regulate the acidity at the cracking and isomerization sites of the typically alumina support. During catalytic reforming a number of chemical conversions occur, e.g., paraffins may be cracked and hydrogenated, or isomerized, or undergo dehydrocyclization; naphthenes with side chains may undergo dehydrocyclization, and naphthene rings are dehydrogenated into aromatic rings. Thus by selecting feed fractions that are rich in naphthenes it is possible to produce a reformate that contains 35-60% of benzenes, toluene and the xylenes. These aromatic compounds may also be extracted from, e.g., hydrotreated pyrolysis naphtha feeds.

In the course of the extraction process, impurities find their way into the sulfolane solvent, possibly from other processing steps upstream of the extraction process, and possibly from decomposition of the sulfolane, which decomposition may be thermal or catalyzed by the various chemicals present or added to the upstream processes. These impurities can cumulate and concentrate in the sulfolane and lead to significant corrosion of the processing equipment used in the extraction process, and if not remedied, result in serious operating and safety problems. The use of pH control, i.e., maintaining the pH value of the sulfolane above about 8.5 by the addition of nonmetallic acid-neutralizing materials and/or corrosion inhibitors such as amines, particularly aliphatic amines such as methyl ethyl amine, has met with but limited success in alleviating this serious problem. The sulfolane is a comparatively expensive solvent and continual addition of fresh solvent to dilute and to replace contaminated solvent is a costly option.

A procedure has now been found which substantially removes the corrosive impurities from the sulfolane efficiently and with very small loss of the solvent.

SUMMARY OF THE INVENTION

In accordance with the invention there is provided a process for reducing the level of corrosive impurities in sulfolane solution containing corrosive impurities and originating from a process for the extraction of aromatic hydrocarbons from petroleum, which process comprises in sequence:

(a) providing an aqueous solution containing less than about 80% by weight of said sulfolane containing corrosive impurities as feed to a membrane-containing electrodialysis unit, (b) electrodialyzing said feed to obtain: (1) a concentrate stream containing a substantial portion of said corrosive impurities, and (2) a diluate stream containing a major portion of said sulfolane, (c) withdrawing said concentrate stream from said electrodialysis unit, and (d) withdrawing said diluate stream from said electrodialysis unit.

In a preferred embodiment, water is removed from said diluate stream by subjecting said diluate stream to fractional distillation, and recovering the sulfolane as a bottoms fraction.

DESCRIPTION OF PREFERRED EMBODIMENTS

The process according to the invention is suitably employed for removing corrosive impurities such as chlorides, sulfates, and sulpholane degradation products such as carboxylic and sulphonic acids. Conventionally sulfolane solvent employed in aromatics extraction will contain a small amount of water, e.g., from about 0.5 to about 3% by weight, and also contain reaction products of the corrosive impurities with materials conventionally added to mitigate their corrosive effect, such as amines, particularly alkanolamines. The sulfolane starting material may be highly colored and may contain small amounts of iron resulting from corrosion of process equipment. When iron is present in the feed, use of a commercially available "greensand" filter, a manganese-containing zeolitic filter, is recommended to pretreat the feed to safeguard against precipitation of iron on the membranes of the electrodialytic unit.

It has been found that the excellent solvent powers of sulfolane often rapidly weaken and deteriorate membranes employed in the electrodialytic unit and that it is necessary if any reasonable service life is to be obtained for the membranes to reduce the concentration of sulfolane to below about 80% by weight by the addition of water. However, the solvent phase to the electrodialytic unit should preferably be predominately aqueous to avoid the build up of resistivity. For this reason it is preferred to provide as feed to the electrodialytic unit an aqueous solution containing less than about 45% by weight of sulfolane containing corrosive impurities. The process of the invention may also be applied to very dilute aqueous solutions of sulfolane, e.g., 5% by weight or less, such as the product resulting from water washing of sulfolane extraction equipment during maintenance shutdowns and the like.

Electrodialysis is by now a well established industrial process. Basically, an electrodialysis unit comprises a plurality of membranes, alternately anionic and cationic, placed between an anode and a cathode connected to a direct current source. The membranes are usually separated from each other by 1 to 5 mm using appropriate spacers, and the feed stream is made to flow through a spacer creating a turbulent path in order to increase turbulence of the liquid contacting the membranes, or alternately in in-sheet type flow to reduce pumping pressure. The construction of the unit is in the form of a stack, like a filter stack. The membranes, which usually contain ion exchange groups, have a fixed positive or negative charge. The cationic membranes have negative fixed charges; the anionic membranes have positive fixed charges. Electrical neutrality in the membrane matrix is satisfied by the migrating cations (through cationic exchange membranes) and anions (through anionic exchange membranes.)

If a feed is introduced uniformly from the top of the electrodialysis unit, it would be found that the streams in the passages in the unit having an anionic membrane on the cathode side of the passage, and vice versa, will become the concentrate streams higher in the ionized (herein impurity) components; to a the streams in passages bounded by anionic membranes on the anode side and cationic membranes on the cathode side, will become depleted in ionized components. Such depleted stream or streams are herein referred to as the diluate stream, and will contain at least a majority of the sulfolane values to be recovered.

Many conventional materials used in the practice are eligible as the membrane material. A useful survey of such materials and of practical embodiments of electrodialysis units is given in, e.g., "Industrial Processing With Membranes", edited by R. E. Lacey and S. Loeb, Wiley-Interscience, New York, 1972, pp.6–7. However, it is greatly preferred to use "tight-pore membranes", instead of more or less conventional materials.

The more or less conventional membranes allow more water molecules to be transferred through the membrane per quantity of electric charge passed through than the tight-pore membranes. The phenomenon of simultaneous water transfer is called electroosmotic flux. Traditionally as this flux is lower, the concentrate will have a higher concentration. In actual practice anion-selective membranes with an electroosmotic flux from about 115 to about 200 gram (water)-/Faraday(electric charge transferred) (g/F) are called conventional membranes, and anion-selective membranes with an electroosmotic flux of less than about 115 g/F are membranes of the tight-pore type. For cation-selective membranes these values are somewhat higher; those with an electroosmotic flux of from 210 to 300 g/F are called conventional membranes, and those with a value lower than about 210 g/F are called membranes of the tight-pore type. Tight-pore membranes have the advantage of allowing easier passage to water than to sulfolane, thus enhancing retention of sulfolane in the diluate stream. In a preferred embodiment of the invention the electrodialysis step is conducted employing electrodialysis cell membrane pairs the sum of whose electroosmotic fluxes is less than 300 g/F.

The direct voltage applied between the anode and the cathode advantageously lies in the range from about 0 and 4.5 volts (V) and is preferably in the range from about 0.5 and 2.5 V. For stability of the membranes it is necessary to employ temperatures less than about 70° C. during electrodialysis. In terms of overall efficiency, it is preferred to carry out the electrodialysis step at temperatures in the range from about 20° C. to about 50° C.

The sulfolane content in the aqueous feed to the electrodialysis unit may be as high as about 80% weight, preferably is in the range from about 1 to about 50% by weight, and most preferably in the range from about 5 to about 45% by weight. These concentrations may be achieved by simply adding water to dilute the sulfolane to the desired concentration. Any precipitate that forms is preferably removed by filtration prior to electrodialysis. Generally the maximum allowable concentration will be determined by the stability of the membranes in the feed at the operating temperature. The stability of the membrane may be determined by immersing the membrane of interest in the proposed feed at the proposed operating temperature for a period of at least three days and after immersion, checking the membrane for change in resistivity, loss of ion exchange capacity, deterioration of the backing (if present), and loss of strength. Membranes which demonstrate little or no loss of these properties generally are satisfactory.

From the electrodialysis unit the concentrate stream containing the great majority of the corrosive impurities is removed for disposal or further treatment. The diluate stream containing the great bulk of the sulfolane having substantially reduced level of corrosive impurities is withdrawn from the electrodialysis unit. If desired the diluate stream may be subjected to treatment to remove water by any known method, and to concentrate the sulfolane to any desired level for further use. In a preferred embodiment the amount of water in the diluate may be reduced by evaporation, e.g., in a single effect evaporator and/or fractional distillation in which case the water is removed overhead and the sulfolane recovered as a bottoms fraction.

The invention will now illustrated with reference to the following examples.

EXAMPLE 1

To a sample of unused sulfolane, water was added in an amount sufficient to reduce the sulfolane concentration to 25% by weight. To test the compatibility of the membrane material with the process medium, a commercial cation exchange membrane available under the trade designation CR62LN available from Ionics, Inc., Watertown, Mass., was immersed in the 25% by weight sulfolane for three days. After immersion the membrane was tested; no change in resistivity, no loss of ion exchange capacity, no attack on the membrane backing and no loss of strength was observed.

EXAMPLE 2

To determine the possible effect on membranes of a feed having different concentrations of sulfolane several solutions containing from 5% to 95% by weight sulfolane were made and samples of membranes approximately 2.54×6.35 square cm were immersed in those solutions. Both cation exchange membranes 61AZL386 and anion exchange membranes IC3-PZL386 were subjected to this treatment. After 13 days immersion the membrane strength was determined by the Instron Stress Test, which determines the stress required to tear the membrane sample under tension. Generally it was found that there was minor but probably not significant loss of membrane strength at concentrations of sulfolane up to about 80% by weight; however, membrane strength losses of 50% and more were observed for solutions where the sulfolane concentration exceeded 80 by weight. Additional experiments where the membranes were immersed for a period of 19 days showed the same degradation pattern.

EXAMPLE 3

To determine whether the corrosive impurities could be removed efficiently and to a sufficient extent, a sample of sulfolane which had been used in service for extracting benzene from a petroleum stream and containing an amine inhibitor was diluted with water to provide a feed solution having a 5% by weight concentration of sulfolane. The dilute solution was found to contain several parts per million of iron and was treated with a greensand filter to remove said iron and filtered to remove any suspended solids from the greensand filter. The resulting solution was then fed to an electrodialysis unit comprised of tight-pore membranes, alternating cationic exchange membranes designated as 61AZL386 and anionic exchange membranes designated as IC3-PZL386. Electrodialysis was carried out at 1.5 V per cell pair. Essentially complete removal of corrosives such as chloride and substantial removal of sulfate were accomplished. The procedure was repeated employing different samples of commercially used sulfolane as the starting material and diluted with water to a final higher concentration of sulfolane in the feed solution to the electrodialysis unit. In one experiment similar membranes which had been used in other service and in storage for a long period of time were used in the electrodialysis unit. As may be seen in the following table good removal of corrosives was achieved in all cases.

TABLE

Results of Electrodialysis on Used Sulfolane Solutions

| Experiment Number | Sulfolane, % W | Feed $C_l$, ppm | Feed $SO_4$, ppm | Diluate $C_l$, ppm | Diluate $SO_4$, ppm |
|---|---|---|---|---|---|
| 1 | 5 | 160 | 38 | 3 | <7 |
| 2 | 39 | 600 | 203 | 6 | 13 |
| 3 | 45 | 750 | 260 | 11 | <30 |

Tight-pore membranes were used in all experiments and the sulfolane loss was 1% or less.

What is claimed is:

1. A process for reducing the level of corrosive impurities in sulfolane solution containing corrosive impurities and originating from a process for the extraction of aromatic hydrocarbons from petroleum, which process comprises in sequence:
   (a) providing an aqueous solution containing less than about 80% by weight of said sulfolane containing corrosive impurities as feed to a membrane-containing electrodialysis unit,
   (b) electrodialyzing said feed to obtain: (1) a concentrate stream containing a substantial portion of said corrosive impurities, and (2) a diluate stream containing a major portion of said sulfolane, and
   (c) withdrawing said diluate stream from said electrodialysis unit.

2. The process of claim 1 wherein step (a) the feed solution contains less than about 45% by weight sulfolane.

3. The process of claim 1 wherein step (b) electrodialysis cell membrane pairs are used the sum of whose electroosmotic fluxes is less than 300 g/F.

4. The process of claim 1 comprising the further step of fractionating said separated diluate stream by fractional distillation, and recovering the sulfolane as a bottoms fraction.

* * * * *